United States Patent
Chen et al.

(10) Patent No.: US 11,906,447 B2
(45) Date of Patent: Feb. 20, 2024

(54) MULTI-CHANNEL STATIC CT DEVICE

(71) Applicants: NUCTECH COMPANY LIMITED, Beijing (CN); Tsinghua University, Beijing (CN)

(72) Inventors: Zhiqiang Chen, Beijing (CN); Li Zhang, Beijing (CN); Xiaofei Xu, Beijing (CN); Le Shen, Beijing (CN); Ming Chang, Beijing (CN); Hu Tang, Beijing (CN); Xin Jin, Beijing (CN); Yunda Sun, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 126 days.

(21) Appl. No.: 17/471,725

(22) Filed: Sep. 10, 2021

(65) Prior Publication Data

US 2022/0091051 A1    Mar. 24, 2022

(30) Foreign Application Priority Data

Sep. 11, 2020   (CN) .......................... 202010957793.1

(51) Int. Cl.
*G01N 23/046*    (2018.01)
*G01N 23/083*    (2018.01)
(Continued)

(52) U.S. Cl.
CPC .......... *G01N 23/10* (2013.01); *G01N 23/046* (2013.01); *G01N 23/083* (2013.01); *G01N 2223/1016* (2013.01); *G01N 2223/204* (2013.01); *G01N 2223/3301* (2013.01); *G01N 2223/335* (2013.01); *G01N 2223/3307* (2013.01); *G01N 2223/3308* (2013.01);
(Continued)

(58) Field of Classification Search
None
See application file for complete search history.

(56) References Cited

U.S. PATENT DOCUMENTS 7,106,830 B2 *  9/2006  Rosner .................... G21K 5/04
                                                      378/146
8,155,272 B2 *  4/2012  Eilbert .................... H05G 1/52
                                                       378/92
(Continued)

FOREIGN PATENT DOCUMENTS

CN      87212001 U  *  7/1988
CN      87212001 U      7/1988
(Continued)

OTHER PUBLICATIONS

PCT International Search Report for PCT/CN2021/117753 dated Nov. 22, 2021 (5 pages).

*Primary Examiner* — Thomas R Artman
(74) *Attorney, Agent, or Firm* — Merchant & Gould P.C.

(57) ABSTRACT

A multi-channel static CT device is provided, and the multi-channel static CT device includes: a scanning channel including a plurality of scanning sub-channels; a distributed X-ray source including a plurality of ray emission points arranged around the scanning channel; and a detector module including a plurality of detectors arranged around the scanning channel, wherein the plurality of detectors are arranged corresponding to the plurality of ray emission points.

16 Claims, 7 Drawing Sheets

(51) Int. Cl.
   *G01N 23/10* (2018.01)
   *G01V 5/00* (2006.01)
(52) U.S. Cl.
   CPC .. *G01N 2223/419* (2013.01); *G01N 2223/639* (2013.01); *G01N 2223/643* (2013.01); *G01V 5/005* (2013.01)

(56) References Cited

U.S. PATENT DOCUMENTS

| | | | |
|---|---|---|---|
| 8,223,919 B2 * | 7/2012 | Morton | H01J 35/045 378/57 |
| 9,453,937 B2 * | 9/2016 | Zhang | G01T 1/2985 |
| 9,541,499 B2 * | 1/2017 | Ikeda | G01N 21/84 |
| 9,778,391 B2 | 10/2017 | Chen et al. | |
| 9,786,041 B2 | 10/2017 | Chen et al. | |
| 10,591,424 B2 * | 3/2020 | Morton | H01J 35/04 |
| 2003/0231739 A1 * | 12/2003 | Rosner | G01N 23/046 378/57 |
| 2010/0303287 A1 * | 12/2010 | Morton | H01J 35/045 382/100 |
| 2010/0316188 A1 * | 12/2010 | Eilbert | H05G 1/70 378/208 |
| 2013/0251098 A1 * | 9/2013 | Morton | H01J 35/045 378/10 |
| 2014/0185743 A1 * | 7/2014 | Zhang | G01T 1/2985 378/10 |
| 2015/0199804 A1 * | 7/2015 | Chen | G01V 5/005 382/141 |
| 2015/0241341 A1 * | 8/2015 | Ikeda | G01N 21/84 378/57 |
| 2020/0200690 A1 * | 6/2020 | Morton | G01N 23/046 |
| 2022/0091051 A1 * | 3/2022 | Chen | G01N 23/046 |

FOREIGN PATENT DOCUMENTS

| | | | | |
|---|---|---|---|---|
| CN | 203012155 U | | 6/2013 | |
| CN | 104749197 A | | 7/2015 | |
| CN | 106596601 A | * | 4/2017 | ............ G01N 23/10 |
| CN | 106645232 A | * | 5/2017 | ............ G01N 23/10 |
| CN | 208459303 U | | 2/2019 | |
| CN | 209132182 U | * | 7/2019 | |
| JP | 2009236633 A | * | 10/2009 | |
| JP | 2010230559 A | * | 10/2010 | |

* cited by examiner

MULTI-CHANNEL STATIC CT DEVICE

CROSS-REFERENCE TO RELATED APPLICATION(S)

This application claims priority to Chinese Patent Application No. 202010957793.1, filed on Sep. 11, 2020, which is incorporated herein by reference in its entirety.

TECHNICAL FIELD

The present disclosure relates to a field of a security inspection, and in particular to a dual-channel static CT device used for a security inspection.

BACKGROUND

X-ray imaging technology is an important technology used for non-destructive inspection, and it has been widely used in many fields. With a popularization of the X-ray imaging technology in a field of security inspection, the market puts forward higher requirements for relevant parameters and indicators, including a higher inspection speed, a smaller device covering area, and more information for accuracy of object imaging. However, for a conventional CT device, it is generally difficult to make a scanning channel larger due to a structural limitation. A static CT device is generally in a single-channel form, which may not further improve its detection efficiency.

SUMMARY

According to embodiments of the present disclosure, a multi-channel static CT device is provided, and the multi-channel static CT device includes: a scanning channel including a plurality of scanning sub-channels; a distributed X-ray source including a plurality of ray emission points arranged around the scanning channel; and a detector module including a plurality of detectors arranged around the scanning channel, wherein the plurality of detectors are arranged corresponding to the plurality of ray emission points.

According to an exemplary embodiment of the present disclosure, each scanning sub-channel of the plurality of scanning sub-channels is controllable individually or uniformly based on a scanning requirement.

According to an exemplary embodiment of the present disclosure, a variable for individually controlling each scanning sub-channel includes at least one of a conveying speed, a conveying direction, a pause, a forward, or a reverse of a conveying mechanism in the scanning sub-channel.

According to an exemplary embodiment of the present disclosure, the plurality of ray emission points and the plurality of detectors are located on a plane intersecting a conveying direction of an inspected object.

According to an exemplary embodiment of the present disclosure, the plurality of ray emission points of the X-ray source are distributed on at least two planes intersecting a conveying direction of an inspected object, and a ray emission point among the plurality of ray emission points of the X-ray source and a corresponding detector among the plurality of detectors of the detector module are arranged on a same plane.

According to an exemplary embodiment of the present disclosure, the plurality of ray emission points located on the same plane are arranged in a linear shape, an L shape, a U shape, a semicircular shape, an arc shape, a parabola shape, or a curve shape.

According to an exemplary embodiment of the present disclosure, the plurality of detectors located on the same plane are arranged in a linear shape, an L shape, a U shape, a semicircular shape, an arc shape, a parabola shape, or a curve shape.

According to an exemplary embodiment of the present disclosure, a total coverage angle of the X-ray source is greater than 180°.

According to an exemplary embodiment of the present disclosure, X-ray beams emitted by the plurality of ray emission points of the X-ray source are perpendicular to a conveying direction of an inspected object, or are inclined with respect to the conveying direction of the inspected object.

According to an exemplary embodiment of the present disclosure, the multi-channel static CT device further includes: a data and image processing system configured to process a signal acquired by the detector module, so as to reconstruct an image of an inspected object in the scanning channel; and a display device configured to display the image of the inspected object.

According to an exemplary embodiment of the present disclosure, a part of the plurality of ray emission points corresponding to one scanning sub-channel of the plurality of scanning sub-channels is operable independently of another part of the plurality of ray emission points corresponding to another scanning sub-channel of the plurality of scanning sub-channels, so as to achieve a single-channel detection mode or a multi-channel detection mode.

According to an exemplary embodiment of the present disclosure, an X-ray beam emitted by the part of the plurality of ray emission points corresponding to one scanning sub-channel of the plurality of scanning sub-channels is configured to cover an effective scanning region in the corresponding scanning sub-channel so as to implement a detection an inspected object in the corresponding scanning sub-channel.

According to an exemplary embodiment of the present disclosure, the part of the plurality of ray emission points corresponding to one scanning sub-channel of the plurality of scanning sub-channels includes a single target point configured to emit an X-ray beam, so as to implement a single-view detection of the inspected object in the corresponding scanning sub-channel.

According to an exemplary embodiment of the present disclosure, the multi-channel detection mode includes a first detection sub-mode in which a scanning sub-channel in operation is individually controlled.

According to an exemplary embodiment of the present disclosure, in the first detection sub-mode, a reconstructed image of the inspected object in the scanning channel is divided into image portions corresponding to respective scanning sub-channels in operation, and the image portions corresponding to respective scanning sub-channels are respectively displayed on different display devices, or displayed in different display regions of a display device.

According to an exemplary embodiment of the present disclosure, in the first detection sub-mode, parts of the plurality of ray emission points corresponding to respective scanning sub-channels in operation emit X-ray beams alternately, so as to avoid a mutual interference between the scanning sub-channels.

According to an exemplary embodiment of the present disclosure, the multi-channel detection mode further includes a second detection sub-mode, in which at least two adjacent scanning sub-channels among the plurality of scanning sub-channels operate, conveying mechanisms in the at least two scanning sub-channels in operation are uniformly controlled to operate in a same direction and at a same speed, and parts of the plurality of ray emission points corresponding to the at least two scanning sub-channels operate.

According to an exemplary embodiment of the present disclosure, in the second detection sub-mode, X-ray beams emitted by parts of the plurality of ray emission points corresponding to the at least two scanning sub-channels cover effective scanning regions in the at least two scanning sub-channels, so as to implement a detection of an inspected object in the at least two scanning sub-channels.

According to an exemplary embodiment of the present disclosure, in the second detection sub-mode, the parts of the plurality of ray emission points corresponding to the at least two scanning sub-channels include a single target point configured to emit an X-ray beam, so as to implement a single-view detection of the inspected object in the at least two scanning sub-channels.

According to an exemplary embodiment of the present disclosure, the scanning channel includes two scanning sub-channels.

According to an exemplary embodiment of the present disclosure, an aspect ratio of the scanning channel is not less than 1.5, a total width of the scanning channel is not less than 1 meter, and a height of the scanning channel is not less than 0.6 meters.

According to an exemplary embodiment of the present disclosure, the X-ray source includes not less than 120 ray emission points.

DETAILED DESCRIPTION OF EMBODIMENTS

Although the present disclosure will be fully described with reference to the accompanying drawings containing the preferred embodiments of the present disclosure, it should be understood that those skilled in the art may modify the utility model described herein while obtaining the technical effects of the present disclosure. Therefore, it should be understood that the above description is a broad disclosure for those of ordinary skilled in the art, and its content is not intended to limit the exemplary embodiments described in the present disclosure.

In addition, in the following detailed description, for the convenience of explanation, many specific details are set forth to provide a comprehensive understanding of the embodiments of the present disclosure. One or more embodiments may also be implemented without these specific details. In other cases, well-known structures and devices are shown in diagrammatic form to simplify the accompanying drawings.

According to a general inventive concept of the present disclosure, a multi-channel static CT device is provided, and the multi-channel static CT device includes: a scanning channel including a plurality of scanning sub-channels; a distributed X-ray source including a plurality of ray emission points arranged around the scanning channel; and a detector module including a plurality of detectors arranged around the scanning channel, wherein the plurality of detectors are arranged corresponding to the plurality of ray emission points.

Figure 1:
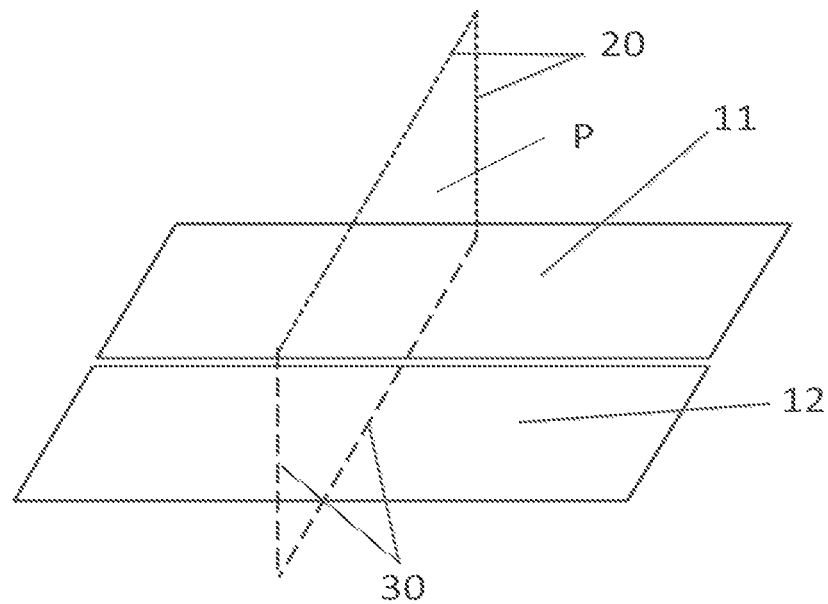
FIG. 1 shows a schematic perspective diagram of a multi-channel static CT device according to an exemplary embodiment of the present disclosure.
Figure 2:
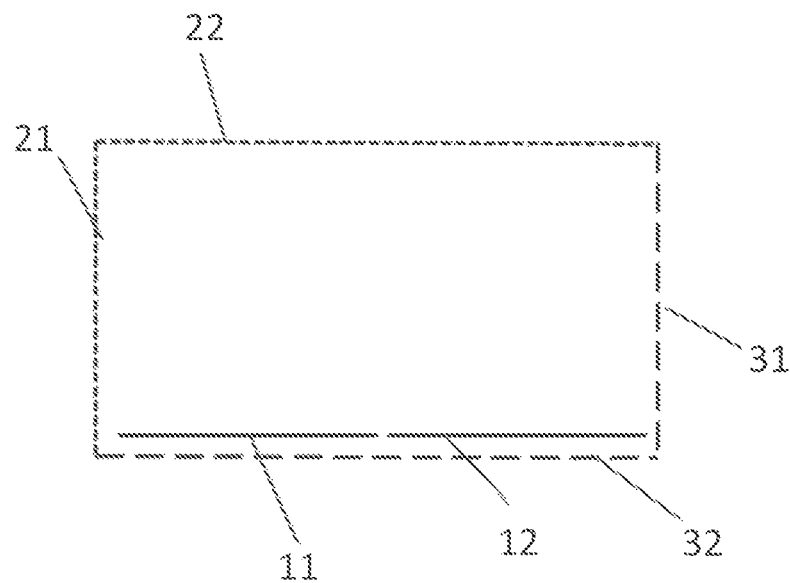
FIG. 2 shows a schematic left view of the multi-channel static CT device shown in FIG. 1.

FIG. 1 shows a schematic perspective diagram of a multi-channel static CT device according to an exemplary embodiment of the present disclosure. FIG. 2 shows a schematic left view of the multi-channel static CT device shown in FIG. 1.

As shown in FIG. 1 to FIG. 2, according to an embodiment of the present disclosure, the multi-channel static CT device includes a scanning channel, a distributed X-ray source 20, and a detector module 30. The scanning channel includes a first scanning sub-channel 11 and a second scanning sub-channel 12 located substantially at a same height, and each scanning sub-channel includes a conveying mechanism used to convey an object to be inspected. The X-ray source 20 includes a plurality of ray emission points used to sequentially generate X-ray beams at different angles. The plurality of ray emission points are arranged around a first side of the scanning channel and an upper side of the scanning channel, that is, the plurality of ray emission points are arranged in a substantially L shape. A part of the plurality of ray emission points located on the first side of the scanning channel is called a first subset 21 of ray emission points, and a part of the plurality of ray emission points located above the scanning channel is called a second subset 22 of ray emission points. Each ray emission point can be controlled to emit an X-ray beam, an emission time, an emission interval and an emission intensity of each ray emission point are adjustable, and each ray emission point may be controlled to be triggered at intervals or continuously. The detector module 30 includes a plurality of detectors used to acquire projections of an inspected object at different angles. The plurality of detectors are arranged around a second side opposite to the first side of the scanning channel and a lower side of the scanning channel, that is, the plurality of detectors are also arranged in a substantially L-shape. A part of the plurality of detectors located on the second side of the scanning channel is called a first subset 31 of detectors, and a part of the plurality of detectors located below the scanning channel is called a second subset 32 of detectors. The plurality of detectors are arranged corresponding to the plurality of ray emission points. When in operation, the plurality of ray emission points of the X-ray source 20 emit beams in sequence, and the detector module 30 acquires according to a frequency of beam emission. In this way, projections of the inspected object at different angles may be obtained, and then a tomographic reconstruction image of the inspected object may be obtained according to an iterative reconstruction algorithm or an analytical reconstruction algorithm.

As shown in FIG. 1 and FIG. 2, each scanning sub-channel may be controlled individually or uniformly based on a scanning requirement. A variable for individually controlling each scanning sub-channel may include at least one of a conveying speed, a conveying direction, a pause, a forward, or a reverse of the conveying mechanism of the scanning sub-channel. For example, in a case that a detection amount for the inspected object is relatively small, it is possible to cause only one scanning sub-channel to operate (that is, in a single-channel detection mode); in a case that the detection amount for the inspected object is relatively large, but a volume of the inspected object is less than a predetermined specification (that is, the whole inspected object can be placed on a scanning sub-channel), it is possible to cause both scanning sub-channels to operate (that is, in a first detection sub-mode of a multi-channel detection mode); in a case that the inspected object has a lame volume (for example, a large width), it is possible to cause both scanning sub-channels to operate synchronously (that is, in a second detection sub-mode of the multi-channel detection mode).

As shown in FIG. 1 and FIG. 2, the plurality of ray emission points of the X-ray source 20 and the plurality of detectors of the detector module 30 are located on a same plane P, which is substantially perpendicular to the conveying direction of the inspected object. It should be noted that in other embodiments of the present disclosure, the plane on which the plurality of ray emission points of the X-ray source 20 and the plurality of detectors of the detector module 30 are located may also be inclined with respect to the conveying direction of the inspected object.

Figure 3:
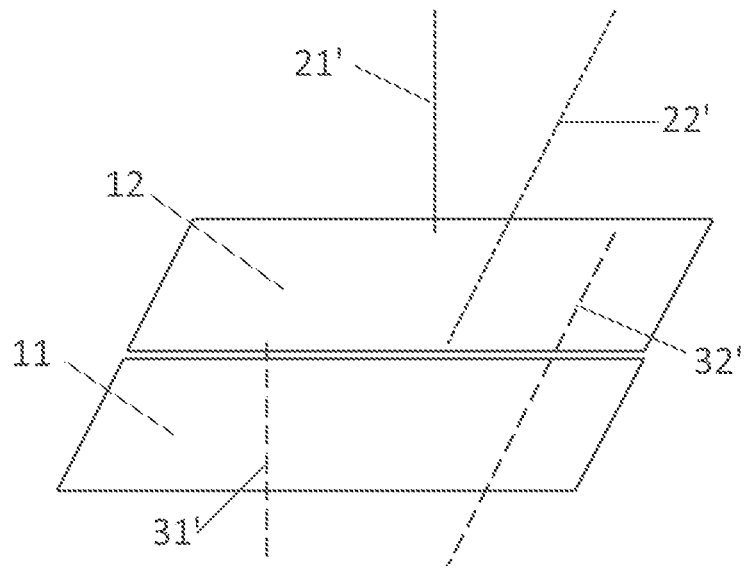
FIG. 3 shows a schematic perspective diagram of a multi-channel static CT device according to another exemplary embodiment of the present disclosure.
Figure 4:
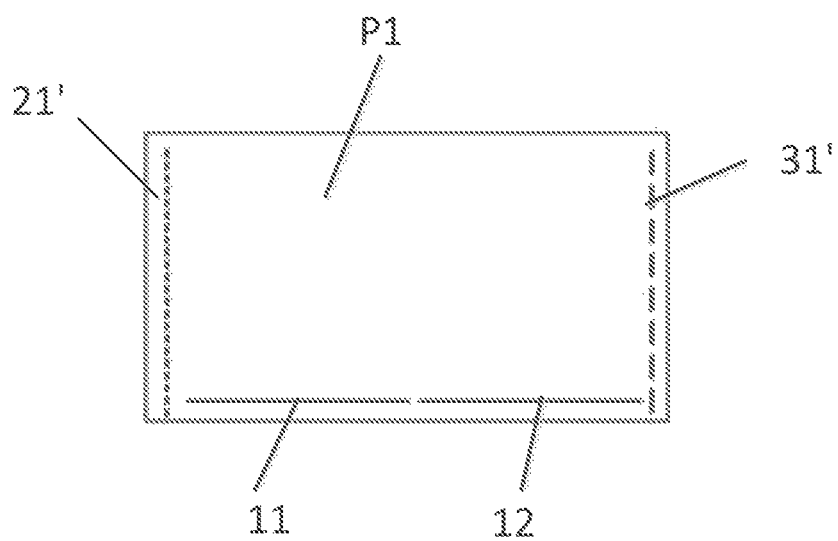
FIG. 4 shows a schematic left view of the multi-channel static CT device shown in FIG. 3.
Figure 5:
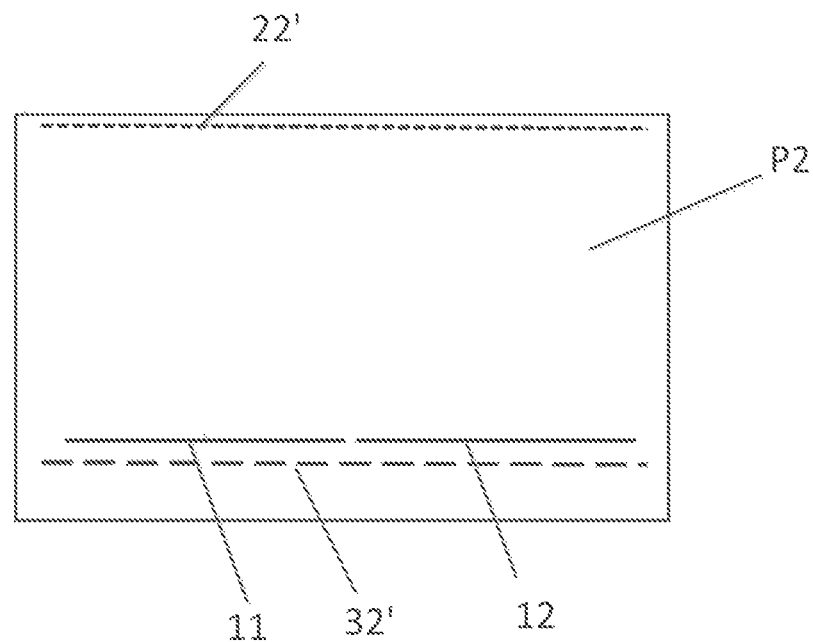
FIG. 5 shows another schematic left view of the multi-channel static CT device shown in FIG. 3.

FIG. 3 shows a schematic perspective diagram of a multi-channel static CT device according to another exemplary embodiment of the present disclosure. FIG. 4 shows a schematic left view of the multi-channel static CT device shown in FIG. 3. FIG. 5 shows another schematic left view of the multi-channel static CT device shown in FIG. 3.

As shown in FIG. 3 to FIG. 5, according to another embodiment of the present disclosure, the multi-channel static CT device includes a scanning channel, a distributed X-ray source 20, and a detector module 30. The scanning channel may include a first scanning sub-channel 11 and a second scanning sub-channel 12 located substantially at a same height, and each scanning sub-channel includes a conveying mechanism used to convey an object to be inspected. The X-ray source 20 includes a plurality of ray emission points used to sequentially generate X-ray beams at different angles. A first subset 21' of ray emission points is located on a first plane P1 and is arranged around the first side of the scanning channel, and a second subset 22' of ray emission points is located on a second plane P2 and is arranged around an upper side of the scanning channel. The detector module 30 includes a plurality of detectors used to acquire projections of an inspected object at different angles. A first subset 31' of detectors is located on the first plane P1 and is arranged around the second side opposite to the first side of the scanning channel, so as to correspond to the first set 21' of ray emission points located on the first plane P1. A second subset 32' of detectors is located on the second plane P2 and is arranged around a lower side the scanning channel, so as to correspond to the second set 22' of ray emission points located on the second plane P2. Since the plurality of ray emission points of the X-ray source 20 and the plurality of detectors of the detector module 30 are distributed on two planes, it is necessary to calculate a time difference between a time when the inspected object passes through the plane P1 and a time when the inspected object passes through the plane P2, then perform matching and alignment according to the time difference, and then perform a high-precision reconstruction of an image of the inspected object by using an algorithm.

As shown in FIG. 3 to FIG. 5, the first plane P1 is substantially perpendicular to the conveying direction of the inspected object, and the second plane P2 is substantially perpendicular to the conveying direction of the inspected object. It should be noted that in other embodiments of the present disclosure, the first plane P1 may be inclined with respect to the conveying direction of the inspected object; and/or the second plane P2 may be inclined with respect to the conveying direction of the inspected object. In addition, in other embodiments of the present disclosure, the plurality of ray emission points of the X-ray source 20 may be distributed on two or more planes that intersect the conveying direction of the inspected object, and a ray emission point among the plurality of ray emission points of the X-ray source 20 and a corresponding detector among the plurality of detectors of the detector module 30 may be arranged on a same plane.

In the embodiments shown in FIG. 1 and FIG. 3, an aspect ratio of the scanning channel is not less than 1.5, a total width of the scanning channel is not less than 1 meter, a height of the scanning channel is not less than 0.6 meter, and the X-ray source 20 includes not less than 120 ray emission points. However, in other embodiments of the present disclosure, a dimension of the scanning channel and the number of ray emission points may be changed.

It should be noted that although in the embodiments described above, the scanning channel only includes two scanning sub-channels, those skilled in the art should understand that in other embodiments of the present disclosure, the scanning channel may include more than two scanning sub-channels. In addition, in the embodiments, the two scanning sub-channels have substantially the same width and the same height. However, in other embodiments of the present disclosure, the two scanning sub-channels may have different widths and different heights to adapt to inspected objects of different specifications.

In the multi-channel static CT device shown in FIG. 1, the plurality of ray emission points located on the same plane P are arranged in an L shape, while in a dual-channel static CT device shown in FIG. 3, the ray emission points located on the same plane (P1 or P2) are arranged in a straight line. However, as an option, the plurality of ray emission points located on a same plane may be arranged in other shapes, such as a U-shape, a semicircular shape, an arc shape, a parabola shape, or a curve shape. Similarly, in the multi-channel static CT device shown in FIG. 1, the plurality of detectors located on the same plane P are arranged in an L shape, while in the dual-channel static CT device shown in FIG. 3, the plurality of detectors located on the same plane (P1 or P2) are arranged in a straight line. However, as an option, the plurality of detectors located on a same plane may be arranged in other shapes, such as a U-shape, a semicircular shape, an arc shape, a parabola shape, or a curve shape. The detector module 30 may be composed of linear detectors or area array detectors.

In the embodiments shown in FIG. 1 and FIG. 3, a total coverage angle of the X-ray source 20 is greater than 180°. For example, as shown in FIG. 1, in a case that the plurality of ray emission points of the X-ray source 20 are located on a same plane and arranged in an L shape, a sum of an angle between a connection line from a first one of the plurality of ray emission points at one end to a center of the scanning channel (that is, a center of a cross-section of the scanning channel) and a connection line from a last one of the plurality of ray emission points at the other end to the center of the scanning channel and an angle between a connection line from a first detector at one end of the detector module 30 to the center of the scanning channel and a connection line from a last detector at the other end of the detector module 30 to the center of the scanning channel (that is, the total coverage angle) is greater than 180°, so as to ensure that adequate tomographic scanning data may be obtained for reconstruction. As shown in FIG. 3, in a case that the plurality of ray emission points of the X-ray source 20 are located on different planes, a sum of an angle between a connection line from a first one of the plurality of ray emission points located on the first plane P1 at one end to the center of the scanning channel (that is, the center of the cross-section of the scanning channel) and a connection line from a last one of the plurality of ray emission points located on the first plane P1 at the other end to the center of the scanning channel and an angle between a connection line from a first detector at one end of the detector module 30 located on the first plane P1 to the center of the scanning channel and a connection line from a last detector at the other end of the detector module 30 located on the first plane P1 to the center of the scanning channel is a first coverage angle, and a sum of an angle between a connection line from a first one of the plurality of ray emission points located on the second plane P2 at one end to the center of the scanning channel (that is, the center of the cross-section of the scanning channel) and a connection line from a last one of the plurality of ray emission points located on the second plane P2 at the other end to the center of the scanning channel and an angle between a connection line from a first detector at one end of the detector module 30 located on the second plane P2 to the center of the scanning channel and a connection line from a last detector at the other end of the detector module 30 located on the second plane P2 to the center of the scanning channel is a second coverage angle. The total coverage angle of the distributed X-ray source 20 is a combination of the first coverage angle and the second coverage angle, which is greater than 180°, so as to ensure that adequate tomographic scanning data may be obtained for reconstruction.

In an exemplary embodiment of the present disclosure, the multi-channel static CT device according to the present disclosure may further include a data and image processing system and a display device. The data and image processing system is used to process a signal acquired by the detector module 30, so as to reconstruct an image of the inspected object in the scanning channel. The display device is used to display the image of the inspected object.

In an embodiment of the present disclosure, a part of the plurality of ray emission points corresponding to one scanning sub-channel of the plurality of scanning sub-channels may operate independently of another part of the plurality of ray emission points corresponding to another scanning sub-channel of the plurality of scanning sub-channels, so as to implement a single-channel detection mode (shown in FIG. 6 to FIG. 8) or a multi-channel detection mode (shown in FIG. 9 to FIG. 14). The part of the plurality of ray emission points corresponding to one scanning sub-channel of the plurality of scanning sub-channels may meet a data requirement for reconstruction. In this way, when the detection amount for the inspected object is relatively small, the single-channel detection mode may be adopted to image only the inspected object in the scanning sub-channel, and in this case, only the ray emission point corresponding to this scanning sub-channel operates. When the detection amount for the inspected object is relatively large, but the volume of the inspected object is less than a predetermined specification, a first detection sub-mode of the multi-channel detection mode may be adopted to improve detection efficiency. When the volume of the inspected object is greater than a predetermined specification, for example, if the whole inspected object cannot be placed in one scanning sub-channel, a second detection sub-mode of the multi-channel detection mode may be adopted.

Figure 6:
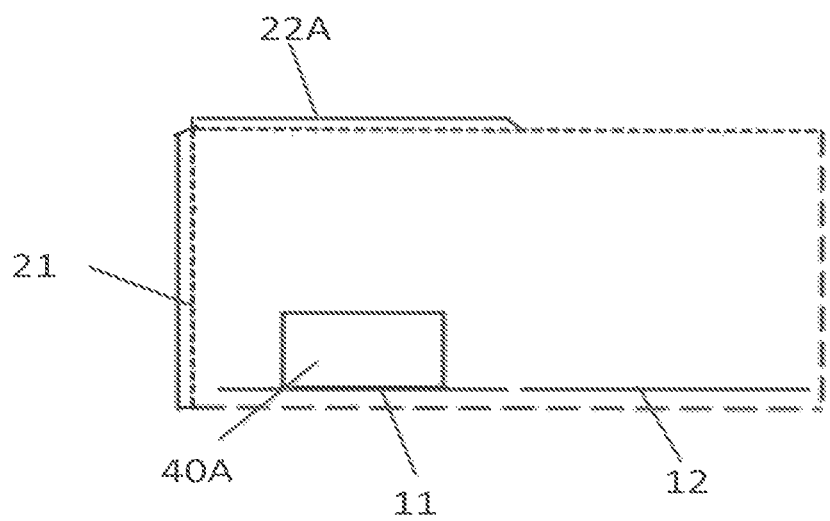
FIG. 6 shows a schematic left view of a multi-channel static CT device in a single-channel detection mode according to an exemplary embodiment of the present disclosure.
Figure 9:
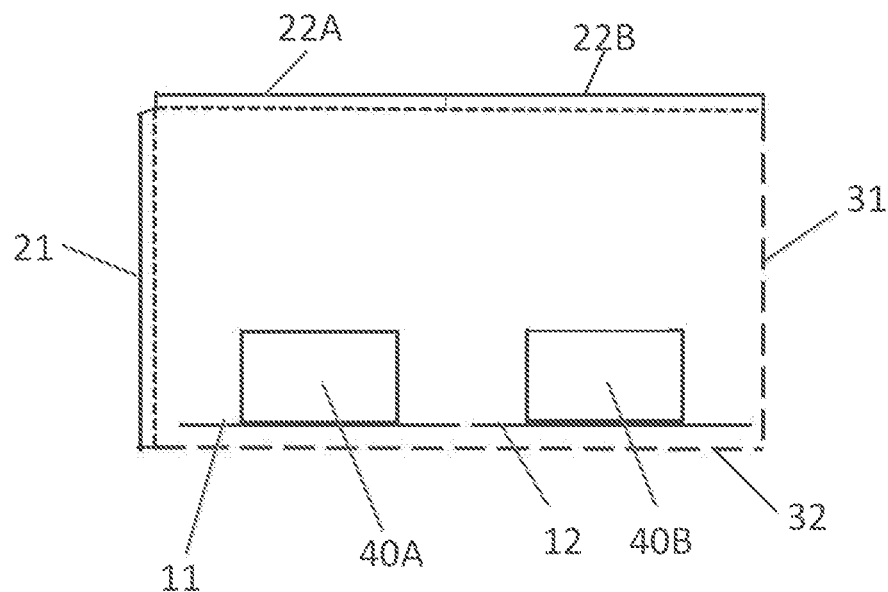
FIG. 9 shows a schematic left view of a multi-channel static CT device in a first detection sub-mode of a multi-channel detection mode according to an exemplary embodiment of the present disclosure.
Figure 12:
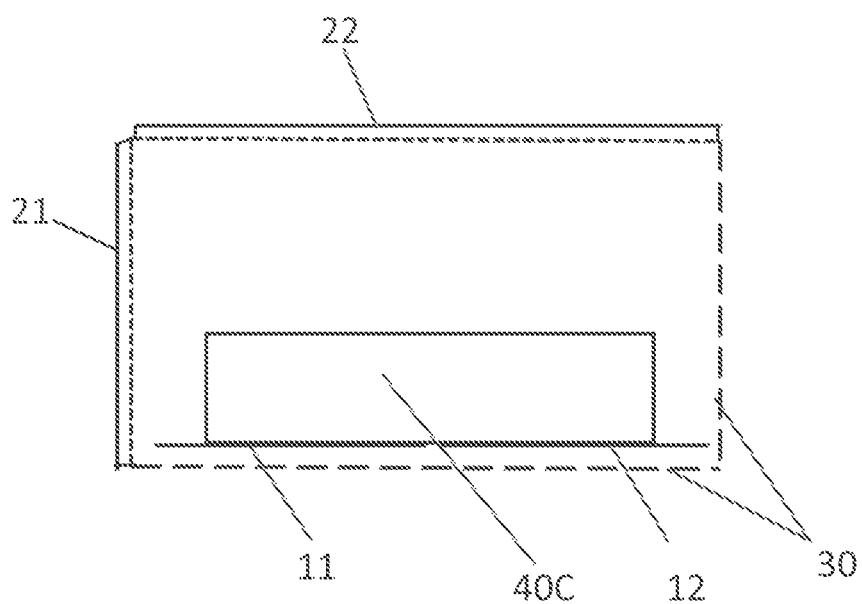
FIG. 12 shows a schematic left view of a multi-channel static CT device in a first detection sub-mode of a multi-channel detection mode according to an exemplary embodiment of the present disclosure.

In an exemplary embodiment of the present disclosure, an X-ray beam emitted by the part of the plurality of ray emission points of the X-ray source 20 corresponding to each scanning sub-channel of the plurality of scanning sub-channels may cover an effective scanning region in the corresponding scanning sub-channel, so as to implement a detection of the inspected object in the corresponding scanning sub-channel. For example, as shown in FIG. 6, the multi-channel static CT device is in the single-channel detection mode, in which X-ray beams emitted by the first subset 21 of ray emission points and a first part 22A of the second subset 22 of ray emission points corresponding to the first scanning sub-channel 11 may cover an effective scanning region in the first scanning sub-channel 11, so as to detect an inspected object 40A in the first scanning sub-channel 11. As shown in FIG. 9, the multi-channel static CT device is in the first detection sub-mode of the multi-channel detection mode, in which the X-ray beams emitted by the first subset 21 of ray emission points and the first part 22A of the second subset 22 of ray emission points corresponding to the first scanning sub-channel 11 may cover the effective scanning region in the first scanning sub-channel 11, so as to detect the inspected object 40A in the first scanning sub-channel 11; X-ray beams emitted by the first subset 21 of ray emission points and a second part 22B of the second subset 22 of ray emission points corresponding to the second scanning sub-channel 12 may cover an effective scanning region in the second scanning sub-channel 12, so as to detect an inspected object 40B in the second scanning sub-channel 12. As shown in FIG. 12, the multi-channel static CT device is in the second detection sub-mode of the multi-channel detection mode, in which X-ray beams emitted by the first subset 21 of ray emission points and the second subset 22 of ray emission points corresponding to the first scanning sub-channel 11 in operation and the second scanning sub-channel 12 in operation may cover the effective scanning region in the first scanning sub-channel 11 and the effective scanning region in the second scanning sub-channel 12, so as to detect an inspected object 40C in the first scanning sub-channel 11 and the second scanning sub-channel 12.

In an exemplary embodiment of the present disclosure, a part of the plurality of ray emission points corresponding to each scanning sub-channel of the plurality of scanning sub-channels may include a single target point used to emit an X-ray beam, so as to implement a single-view detection of the inspected object in the corresponding scanning sub-channel. For example, as shown in FIG. 6, the multi-channel static CT device is in the single-channel detection mode, in which a single target point (that is, 22A) among the first subset 21 of ray emission points and the first part 22A of the second subset 22 of ray emission points corresponding to the first scanning sub-channel 11 may emit an X-ray beam, so as to implement the single-view detection of the inspected object 40A in the first scanning sub-channel 11. As shown in FIG. 9, the multi-channel static CT device is in the first detection sub-mode of the multi-channel detection mode, in which a single target point (that is, 22X) among the first subset 21 of ray emission points and the first part 22A of the second subset 22 of ray emission points corresponding to the first scanning sub-channel 11 may emit an X-ray beam, so as to implement the single-view detection of the inspected object 40A in the first scanning sub-channel 11; a single target point (that is, 22Y) among the first subset 21 of ray emission points and the second part 22B of the second subset 22 of ray emission points corresponding to the second scanning sub-channel 12 may emit an X-ray beam, so as to implement the single-view detection of the inspected object 40B in the second scanning sub-channel 12. As shown in FIG. 12, the multi-channel static CT device is in the second detection sub-mode of the multi-channel detection mode, in which a single target point (that is, 22Z) among the first subset 21 of ray emission points and the second subset 22 of ray emission points corresponding to the first scanning sub-channel 11 in operation and the second scanning sub-channel 12 in operation may emit an X-ray beam, so as to implement the single-view detection of the inspected object 40C in the first scanning sub-channel 11 and the second scanning sub-channel 12.

The detection mode of the multi-channel static CT device provided by the present disclosure will be described in detail below.

Figure 7:
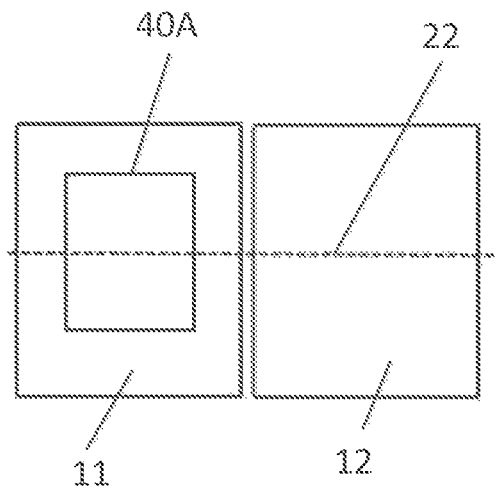
FIG. 7 shows a schematic top view of the multi-channel static CT device shown in FIG. 6.
Figure 8:
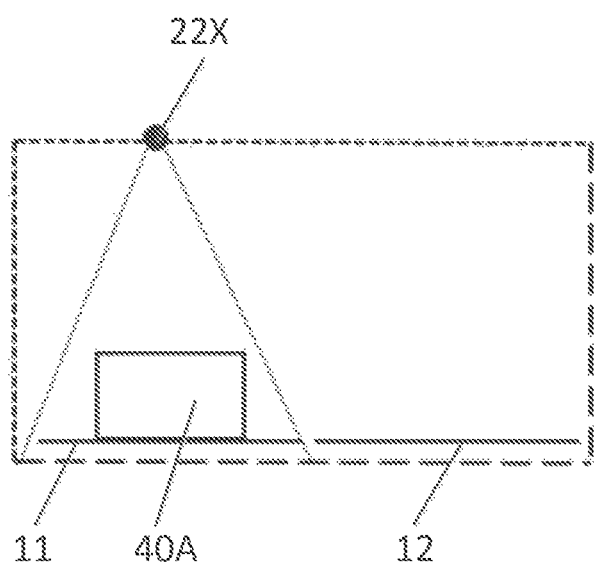
FIG. 8 shows a schematic diagram of the multi-channel static CT device shown in FIG. 6 performing single-view detection in the single-channel detection mode.

In a case that the detection amount for the inspected object is not large, the single-channel detection mode may be adopted, that is, only the conveying mechanism of one scanning sub-channel is turned on, and only the ray emission point corresponding to the scanning sub-channel operates to image the inspected object in the corresponding scanning sub-channel. For example, as shown in FIG. 6 to FIG. 8, the conveying mechanism of the first scanning sub-channel 11 is in operation, and the conveying mechanism of the second scanning sub-channel 12 is turned off. In this case, only the first subset 21 of ray emission points and the first part 22A of the second subset 22 of ray emission points in FIG. 6 operate. In this mode, since only part of the ray emission points operate, a lifetime of the X-ray source 20 may be increased. Therefore, when in operation, a mode in which the first scanning sub-channel 11 and the second scanning sub-channel 12 operate in turn may be adopted to balance the lifetime of the X-ray source 20.

In the single-channel detection mode, when an accuracy of detection does not need to be high, the single-view detection may be adopted. For example, as shown in FIG. 8, the ray emission point 22X above the first scanning sub-channel 11 may operate, and the X-ray beam emitted by the ray emission point 22X may cover the effective scanning region in the first scanning sub-channel 11, so as to implement the single-view detection of the inspected object 40A in the first scanning sub-channel 11.

Figure 10:
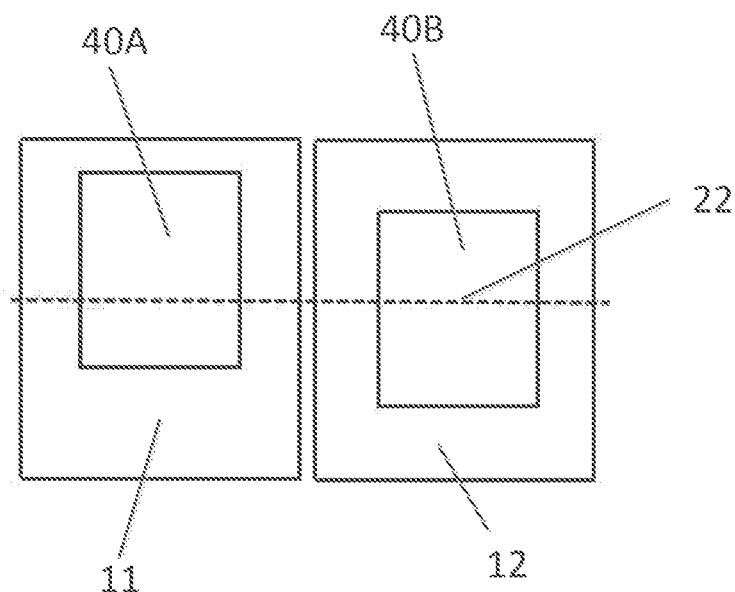
FIG. 10 shows a schematic top view of the multi-channel static CT device shown in FIG. 9.

In a case that the detection amount for the inspected object is large, the first detection sub-mode of the multi-channel detection mode may be adopted, that is, the conveying mechanisms of at least two scanning sub-channels are turned on, and the ray emission points corresponding to the at least two scanning sub-channels operate to image the inspected objects in the at least two scanning sub-channels. For example, as shown in FIG. 9 to FIG. 10, both the conveying mechanism of the first scanning sub-channel 11 and the conveying mechanism of the second scanning sub-channel 12 are turned on, and the first subset 21 of ray emission points and the first part 22A and the second part 22B of the second subset 22 of ray emission points operate. In this mode, each scanning sub-channel may be individually controlled according to the inspection requirement. The variable for individually controlling each scanning sub-channel may include the conveying speed, the conveying direction, the pause, the forward, or the reverse of the conveying mechanism. Since scanning is performed through a plurality of scanning sub-channels, the detection efficiency may be improved greatly.

In an exemplary embodiment of the present disclosure, when the detection is performed in the first detection sub-mode, parts of the plurality of ray emission points corresponding to respective scanning sub-channels in operation may emit the X-ray beams alternately, so as to avoid a mutual interference between the scanning sub-channels. As shown in FIG. 9, the first part 22A and the second part 22B of the first subset 22 of ray emission points emit light alternately at a high frequency, while acquiring data of a detector corresponding to the ray emission point 22A and data of a detector corresponding to the ray emission point 22B, so as to implement the detection in the dual-channel detection mode. Different from a conventional dual-channel detection mode, the present disclosure adopts the multi-focus distributed X-ray source 20, a beam emission of the X-ray source 20 may be controlled periodically, and the ray emission point 22A and the ray emission point 22B may be switched quickly in a high frequency mode, so as to avoid a mutual interference between the scanning sub-channel 11 and the scanning sub-channel 12.

When post-processing an image obtained in the first detection sub-mode, a reconstructed image of the inspected object in the at least two scanning sub-channels in operation may be divided into image portions corresponding to respective scanning sub-channels according to motion states and a geometric relationship of the conveying mechanisms, and the image portions corresponding to the scanning sub-channels may be respectively displayed on different display devices, or displayed in different display regions of the display device.

Figure 11:
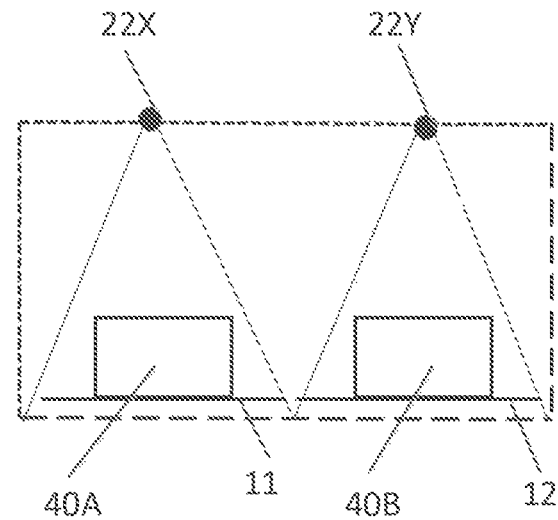
FIG. 11 shows a schematic diagram of the multi-channel static CT device shown in FIG. 9 performing single-view detection in the first detection sub-mode of the multi-channel detection mode.

In the first detection sub-mode of the multi-channel detection mode, when an accuracy of the detection does not need to be high, the single-view detection may be adopted. For example, as shown in FIG. 11, the ray emission point 22X above the first scanning sub-channel 11 may operate, and the X-ray beam emitted by the ray emission point 22X may cover the effective scanning region in the first scanning sub-channel 11, so as to implement the single-view detection of the inspected object 40A in the first scanning sub-channel 11, while the ray emission point 22Y above the second scanning sub-channel 12 may operate, and the X-ray beam emitted by the ray emission point 22Y may cover the effective scanning region in the second scanning sub-channel 12, so as to implement the single-view detection of the inspected object 40B in the second scanning sub-channel 12.

In an exemplary embodiment of the present disclosure, when the single-view detection is performed in the first detection sub-mode, the ray emission point 22X and the ray emission point 22Y may emit light alternately at a high frequency, while acquiring data of a detector corresponding to the ray emission point 22X and data of a detector corresponding to the ray emission point 22Y, so as to implement the single-view detection in the first detection sub-mode. Different from a single-view detection in a conventional dual-channel detection mode, the present disclosure adopts the multi-focus distributed X-ray source 20, and the beam emission of the X-ray source 20 may be controlled periodically, and the ray emission point 22X and the ray emission point 22Y may be switched quickly in a high frequency mode, so as to avoid a mutual interference between the scanning sub-channel 11 and the scanning sub-channel 12.

Figure 13:
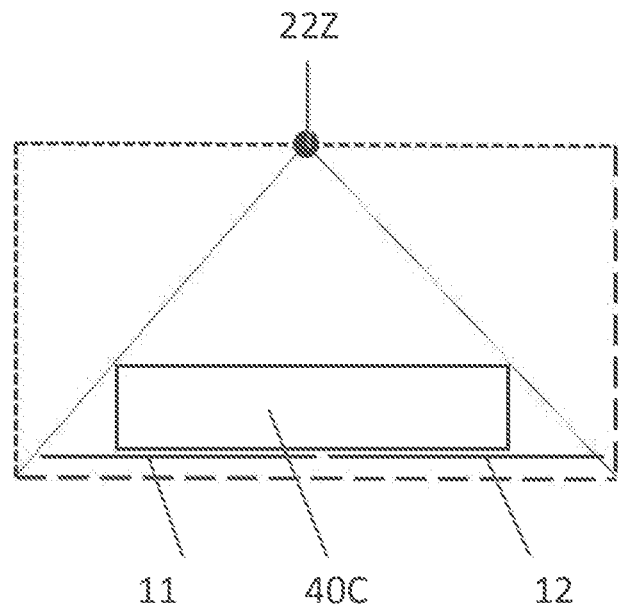
FIG. 13 shows a schematic top view of the multi-channel static CT device shown in FIG. 12.

In a case that the inspected object has a large volume, the second detection sub-mode may be adopted. In this case, the inspected object may be placed in at least two adjacent scanning sub-channels, so that the inspected object may be conveyed by the conveying mechanisms in the at least two scanning sub-channels. The conveying mechanisms in the at least two scanning sub-channels in operation are controlled uniformly to maintain the same direction and the same speed. The ray emission points corresponding to the at least two scanning sub-channels operate to image the inspected object in the at least two scanning sub-channels. For example, as shown in FIG. 12 and FIG. 13, the conveying mechanism in the first scanning sub-channel 11 and the conveying mechanism in the second scanning sub-channel 12 operate, and the first subset 21 of ray emission points and the second subset 22 of ray emission points operate. When post-processing an image obtained in the second detection sub-mode, a reconstructed image of the inspected object 40C in the first scanning sub-channel 11 and the second scanning sub-channel 12 may be transmitted to a display device for display. In this mode, a width of the inspected object may be at least doubled compared to that in a single-channel case.

Figure 14:
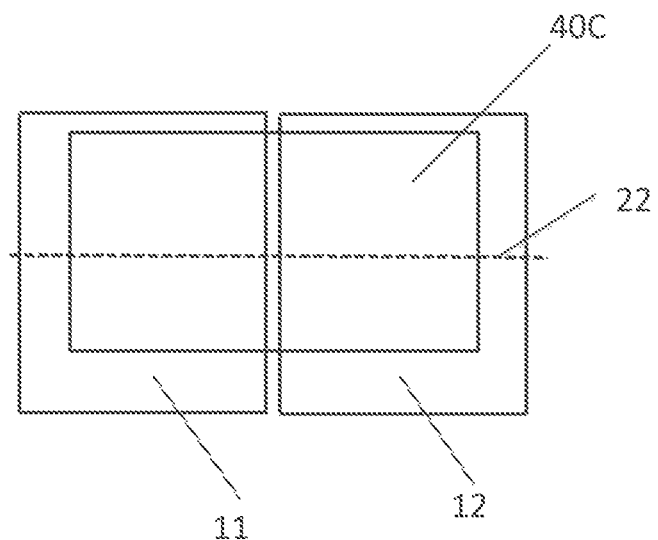
FIG. 14 shows a schematic diagram of the multi-channel static CT device shown in FIG. 12 performing single-view detection in the second detection sub-mode of the multi-channel detection mode.

In the second detection sub-mode, when an accuracy of detection does not to be high, the single-view detection may be adopted. A ray emission point above the at least two scanning sub-channels may operate, and an X-ray beam emitted by the ray emission point may cover the effective scanning regions in the at least two scanning sub-channels, so as to implement the single-view detection of the inspected object in the at least two scanning sub-channels. For example, as shown in FIG. 14, a ray emission point 22Z above the entire scanning channel may operate, and the X-ray beam emitted by the ray emission point 22Z may cover both the effective scanning region in the first scanning sub-channel 11 and the effective scanning region in the second scanning sub-channel 12, so as to implement the single-view detection of the inspected object 40C in the first scanning sub-channel 11 and the second scanning sub-channel 12.

It should be noted that the above-mentioned embodiments only illustrate a case that the X-ray source 20 and the detector module 30 are located on the same plane. However, in other embodiments of the present disclosure, the X-ray source 20 and the detector module 30 may be arranged on a plurality of planes, and the principle is the same as the above. Similarly, in the embodiments shown in FIG. 6, FIG. 9 and FIG. 12, the ray emission points shown to implement the single-view detection are arranged above the scanning channel. However, in other embodiments of the present disclosure, the ray emission point shown to achieve the single-view detection may be arranged below the scanning channel, and the principle is similar to the above.

According to the dual-channel static CT device described in the various embodiments of the present disclosure described above, the detection efficiency of the existing static CT device may be improved, and a detection of an ultra-wide inspected object may be supported, so as to achieve an objective that a passing rate is doubled in a case of covering almost the same area, and the covering area is reduced under a premise of the same detection passing rate. The dual-channel static CT device may operate in three detection modes based on the detection amount for the inspected object and the volume of the inspected object, so as to be applied to different scenarios.

Those skilled in the art may understand that the embodiments described above are exemplary, and those skilled in the art may make improvements. The structures described in the various embodiments may be combined freely without conflicts in structure or principle.

Although the present disclosure is described with reference to the accompanying drawings, the embodiments disclosed in the accompanying drawings are for illustrative purposes only and are not to be construed as limiting the present disclosure.

Although some embodiments of the general inventive concept of the present disclosure have been illustrated and described, it should be understood by those of ordinary skilled in the art that these embodiments may be changed without departing from the principle and spirit of the general inventive concept of the present disclosure. The scope of the present disclosure is defined by the claims and their equivalents.

It should be noted that the word "comprising" or "including" does not exclude other elements or steps, and the word "a", "an" or "one" does not exclude a plurality. In addition, any reference signs in the claims should not be construed as limiting the scope of the present disclosure.

What is claimed is:

1. A multi-channel static CT device, comprising:
   a scanning channel comprising a plurality of scanning sub-channels, wherein each scanning sub-channel of the plurality of scanning sub-channels comprises a conveying mechanism configured to convey an inspected object;
   a distributed X-ray source comprising a plurality of ray emission points arranged around the scanning channel; and
   a detector module comprising a plurality of detectors arranged around the scanning channel, wherein the plurality of detectors are arranged corresponding to the plurality of ray emission points,
   wherein a part of the plurality of ray emission points corresponding to one of the plurality of scanning sub-channels is operable independently of another part of the plurality of ray emission points corresponding to another one of the plurality of scanning sub-channels, so as to implement a multi-channel detection mode,
   wherein the multi-channel detection mode comprises a first detection sub-mode, wherein in the first detection sub-mode, at least two scanning sub-channels among the plurality of scanning sub-channels operate, each of the at least two scanning sub-channels is configured to carry a respective inspected object placed on the each of the at least two scanning sub-channels, and the at least two scanning sub-channels in operation are individually controlled, wherein the multi-channel detection mode further comprises a second detection sub-mode, wherein in the second detection sub-mode, at least two adjacent scanning sub-channels among the plurality of scanning sub-channels operate, the at least two adjacent scanning sub-channels are configured to carry an inspected object placed on the at least two adjacent scanning sub-channels, the conveying mechanisms in the at least two adjacent scanning sub-channels in operation are uniformly controlled to operate in a same direction and at a same speed, and parts of the plurality of ray emission points corresponding to the at least two adjacent scanning sub-channels operate.

2. The multi-channel static CT device of claim 1, wherein a variable for individually controlling each scanning sub-channel comprises at least one of:

a conveying speed of the conveying mechanism in the scanning sub-channel, a conveying direction of the conveying mechanism in the scanning sub-channel, a pause of the conveying mechanism in the scanning sub-channel, a forward of the conveying mechanism in the scanning sub-channel, or a reverse of a conveying mechanism in the scanning sub-channel.

3. The multi-channel static CT device of claim 1, wherein the plurality of ray emission points and the plurality of detectors are located on a plane intersecting a conveying direction of the inspected object.

4. The multi-channel static CT device of claim 3, wherein the plurality of ray emission points located on the same plane are arranged in a linear shape, an L shape, a U shape, a semicircular shape, an arc shape, a parabola shape, or a curve shape.

5. The multi-channel static CT device of claim 3, wherein the plurality of detectors located on the same plane are arranged in a linear shape, an L shape, a U shape, a semicircular shape, an arc shape, a parabola shape, or a curve shape.

6. The multi-channel static CT device of claim 1, wherein the plurality of ray emission points of the X-ray source are distributed on at least two planes intersecting a conveying direction of the inspected object, and a ray emission point among the plurality of ray emission points of the X-ray source and a corresponding detector among the plurality of detectors of the detector module are arranged on a same plane.

7. The multi-channel static CT device of claim 1, wherein a total coverage angle of the X-ray source is greater than 180°.

8. The multi-channel static CT device of claim 1, wherein X-ray beams emitted by the plurality of ray emission points of the X-ray source are perpendicular to a conveying direction of the inspected object, or are inclined with respect to the conveying direction of the inspected object.

9. The multi-channel static CT device of claim 1, further comprising:

a data and image processing system configured to process a signal acquired by the detector module, so as to reconstruct an image of the inspected object in the scanning channel; and a display device configured to display the image of the inspected object.

10. The multi-channel static CT device of claim 1, wherein an X-ray beam emitted by the part of the plurality of ray emission points corresponding to one of the plurality of scanning sub-channels is configured to cover an effective scanning region in the corresponding scanning sub-channel, so as to implement a detection of the inspected object in the corresponding scanning sub-channel.

11. The multi-channel static CT device of claim 10, wherein the part of the plurality of ray emission points corresponding to one of the plurality of scanning sub-channels comprises a single target point configured to emit an X-ray beam, so as to implement a single-view detection of the inspected object in the corresponding scanning sub-channel.

12. The multi-channel static CT device of claim 1, wherein in the first detection sub-mode, the reconstructed image of the inspected object in the scanning channel is divided into image portions corresponding to respective scanning sub-channels in operation, and the image portions corresponding to respective scanning sub-channels are respectively displayed on different display devices, or displayed in different display regions of a display device.

13. The multi-channel static CT device of claim 1, wherein in the first detection sub-mode, parts of the plurality of ray emission points corresponding to respective scanning sub-channels in operation emit X-ray beams alternately, so as to avoid a mutual interference between the scanning sub-channels.

14. The multi-channel static CT device of claim 1, wherein in the second detection sub-mode, X-ray beams emitted by the parts of the plurality of ray emission points corresponding to the at least two scanning sub-channels cover effective scanning regions in the at least two scanning sub-channels, so as to implement a detection of the inspected object in the at least two scanning sub-channels; and wherein in the second detection sub-mode, the parts of the plurality of ray emission points corresponding to the at least two scanning sub-channels comprise a single target point configured to emit an X-ray beam, so as to implement a single-view detection of the inspected object in the at least two scanning sub-channels.

15. The multi-channel static CT device of claim 1, wherein the scanning channel comprises two scanning sub-channels.

16. The multi-channel static CT device of claim 15, wherein an aspect ratio of the scanning channel is not less than 1.5, a total width of the scanning channel is not less than 1 meter, and a height of the scanning channel is not less than 0.6 meters; or wherein the X-ray source comprises not less than 120 ray emission points.

* * * * *